US005960826A

United States Patent [19]

Hebblethwaite et al.

[11] Patent Number: 5,960,826

[45] Date of Patent: Oct. 5, 1999

[54] FLUID STORAGE TANK WITH A SPILL CONTAINMENT SYSTEM

[76] Inventors: Russ Hebblethwaite, Box 729; Darryl Bonifacio, General Delivery, both of Elk Point, Alberta, Canada, T0A 1A0

[21] Appl. No.: 08/796,327

[22] Filed: Feb. 7, 1997

[51] Int. Cl.[6] .............................. F16K 37/00; F16K 24/00

[52] U.S. Cl. .......................... 137/551; 137/574; 137/576; 137/589; 137/382

[58] Field of Search .................................... 137/377, 382, 137/347, 589, 574, 583, 576, 551

[56] References Cited

U.S. PATENT DOCUMENTS

| | | | |
|---|---|---|---|
| 1,156,469 | 10/1915 | Dodge | 137/347 |
| 1,162,422 | 11/1915 | Wenig | 137/347 |
| 1,572,727 | 2/1926 | Kerr . | |
| 2,026,279 | 12/1935 | Jackson . | |
| 2,327,628 | 8/1943 | Ewing . | |
| 2,460,159 | 1/1949 | White | 137/589 |
| 2,609,964 | 9/1952 | Cadwell . | |
| 3,458,429 | 7/1969 | Watson et al. | 137/574 |
| 3,653,395 | 4/1972 | Chapman | 137/574 |
| 3,963,144 | 6/1976 | Berwald . | |
| 4,112,964 | 9/1978 | Banks | 137/574 |
| 4,278,115 | 7/1981 | Briles et al. . | |
| 4,542,764 | 9/1985 | Brittingham et al. | 137/347 |
| 4,890,638 | 1/1990 | Davenport . | |
| 5,139,390 | 8/1992 | Rajewski | 137/589 |
| 5,141,013 | 8/1992 | Zink et al. | 137/382 |
| 5,154,312 | 10/1992 | Robbins . | |

*Primary Examiner*—A. Michael Chambers
*Attorney, Agent, or Firm*—Emery Jamieson

[57] ABSTRACT

An above-ground oil storage tank with a valve and spill containment system. The tank comprises an internal secondary chamber which is readily accessible from the exterior. The secondary chamber houses an outlet valve and may also house sample taps, electronic level indicators and temperature gauges, keeping these components protected from the elements in a warm and dry environment. The secondary chamber also contains spills from the outlet valve and sample taps and may include means to conveniently recover spilled fluid. The tank may also include overflow control means which prevents overflow of fluid from the tank and directs such fluid into the secondary chamber, and loading means within the secondary chamber.

17 Claims, 8 Drawing Sheets

FLUID STORAGE TANK WITH A SPILL CONTAINMENT SYSTEM

TECHNICAL FIELD

The invention relates to an above-ground fluid storage tank, and in particular to an oil storage tank, with a valve and spill containment system.

BACKGROUND TO THE INVENTION

When crude oil is pumped out of the ground, often it is pumped along with a mixture of sand and water. This mixture is pumped directly to above-ground oil storage tanks for temporary storage in the field. Because the proportion of water to oil varies from oil well to oil well, these tanks must have valves at different levels on the tank from which oil or water is drawn off. Although these tanks may vary in size from 100 barrel capacity to over 100,000 barrel capacity, a common size tank is in the 750 to 1000 barrel range. Such a tank is normally cylindrical, has a radius of approximately 7½ feet and stands approximately 25 to 32 feet high.

Within these tanks, the sand and water settles to the bottom. A series of valves and taps are provided on the exterior of the tank to draw off or sample the fluid at different heights from the tank. A common arrangement is to provide a loading spout and valve at about the 12 foot mark, a series of sample taps at the three foot, six foot, nine foot and 12 foot marks and an outlet valve and nozzle at about the three foot mark. Normally, fluid is drawn out of the tank through the three foot outlet valve by a vacuum truck which applies a vacuum to the tank through a hose.

These external valves and taps, and especially the outlet valve and nozzle at the three foot mark, are subject to the elements. Abrasive dirt and dust may cause premature wear or seizure of the valve. It may corrode. In colder weather, the valve may freeze-up due to moisture despite the fact these tanks are usually heated from within by a burner tube. When the valve does freeze-up either it is forced open or steamer trucks must be called in to thaw the frozen valve and to allow the oil or water in the tank to be withdrawn. Often the valve cracks or breaks when it is forced open. Replacing the valve is an expensive and time-consuming operation as the tank must be emptied. Calling a steamer truck is also expensive because of the down-time while the vacuum truck stands by idly waiting for the services of the steamer truck.

Above-ground oil storage tanks also create risks of environmental damage. There is always spillage from the three foot outlet valve or the loading spout whenever a hose is connected or disconnected. Also these tanks are known to overflow if they are not emptied on a regular basis. The overflow occurs through vents and thief hatches normally provided at the top of the tank and the oil runs down the exterior of the tank onto the ground.

One cumbersome prior art solution to the freeze-up problem is to wrap these valves in insulation, to prevent freezing. However, this insulation may come loose and further, deteriorates quickly as it becomes saturated with oil and salt water. Also, insulating the valve does not always ensure the valve does not freeze in very cold weather.

Another prior art solution is to build a cabinet around the three foot valve on the exterior of the tank. This cabinet does not have a floor; it is open to the ground. However, this solution also does not prevent freezing of the valve in very cold weather and provides only limited containment of spills and leakage from the valve in that the ground is still exposed.

A further problem exists with the prior art: the vents and the thief hatch are known to freeze shut in cold weather. When this happens and fluid is drained from the tank, either by way of a vacuum truck hooked up to the three foot outlet valve or a tanker truck top loading fluid from the loading spout, the tank may collapse from the pressure differential caused by the partial vacuum created within the tank.

There is therefore a need in the industry for an oil storage tank with a valve and spill containment system. In particular, there is a need for a tank where the valves are kept in a warm and dry environment, protected from the elements, but still readily accessible, and, further, where spillage from the valves is contained.

It is an object of the present invention to reduce or obviate these drawbacks in the prior art referred to above and fulfil this need in the industry.

DISCLOSURE OF INVENTION

In general terms, the present invention provides, in a fully assembled state, an above-ground fluid storage tank having a valve and spill containment system, comprising:

(a) an outer tank wall having a tank floor, lateral section and a tank roof defining a primary fluid collection chamber;

(b) an inner tank wall, secured to the outer tank wall, defining a secondary containment chamber within the primary chamber, the inner tank wall further defining an opening;

(c) outlet means secured to the inner tank wall and associated with the opening for draining the primary chamber, which outlet means are enclosed by the secondary containment chamber; and (d) access means for providing access to the secondary containment chamber and the outlet means.

The invention preferably also comprises means for recovering fluids accumulated in the secondary chamber, which recovery means may be associated with the outlet means.

In accordance with the preferred embodiment, the invention may also comprise an overflow tube within the primary chamber, which overflow tube prevents leaking from the top of the tank by allowing fluid to escape into the secondary chamber.

In a non-assembled state, and still defined in general terms, the invention provides a valve and spill containment device for use in an above-ground fluid storage tank having a tank floor, which device is attached to the interior of the tank forming a secondary containment chamber within the tank, the device comprising:

(a) a containment wall defining an outlet opening;

(b) outlet means secured to the containment wall and associated with the outlet opening;

where the outlet means is enclosed by the secondary chamber.

BRIEF DESCRIPTION OF DRAWINGS

Embodiments of the invention will now be described with reference to the accompanying drawings in which.

BEST MODE OF CARRYING OUT INVENTION

Figure 1:
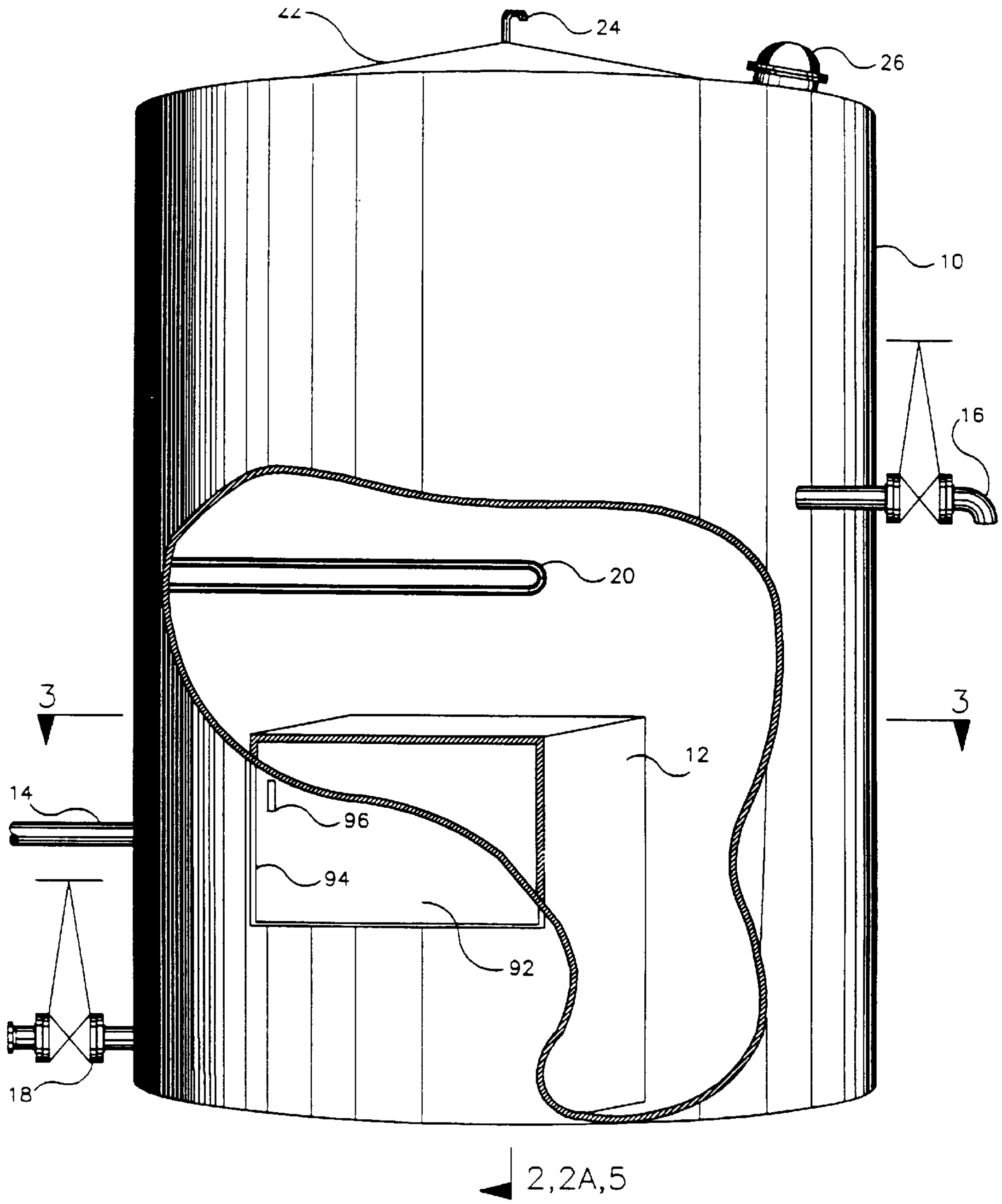
FIG. 1 is a pictorial view of the exterior of an embodiment of the invention.

Referring to FIG. 1, the invention is an above-ground fluid storage tank (10) with a valve and spill containment system (12). A conventional oil storage tank (10) is cylindrical and has a storage capacity of approximately 750 to 1000 barrels, has a radius of approximately 7½ feet and stands approximately 25 to 32 feet high. The preferred embodiment described herein refers to a tank of these approximate dimensions, however, the present invention may easily be adapted to be appropriate for smaller or larger tanks.

Oil wells pump out a mixture of oil, water or salt water and solid particulate matter, such as sand. This mixture is pumped directly into the tank (10) through an inlet pipe (14). The oil in the tank (10) is primarily drawn off by a loading spout (16) which is located approximately 12 feet high. The sand and water settle to the bottom of the tank and may be withdrawn periodically through a waste outlet (18) near the bottom of the tank (10). In cold climates, the tank (10) is heated from within by a burner tube (20), and the exterior of the tank (10) is insulated with a spray-on urethane foam, as is well known in the art. The roof (22) of the tank (10) has a vent (24) and a thief hatch (26) which are also well known in the art.

Figure 2:
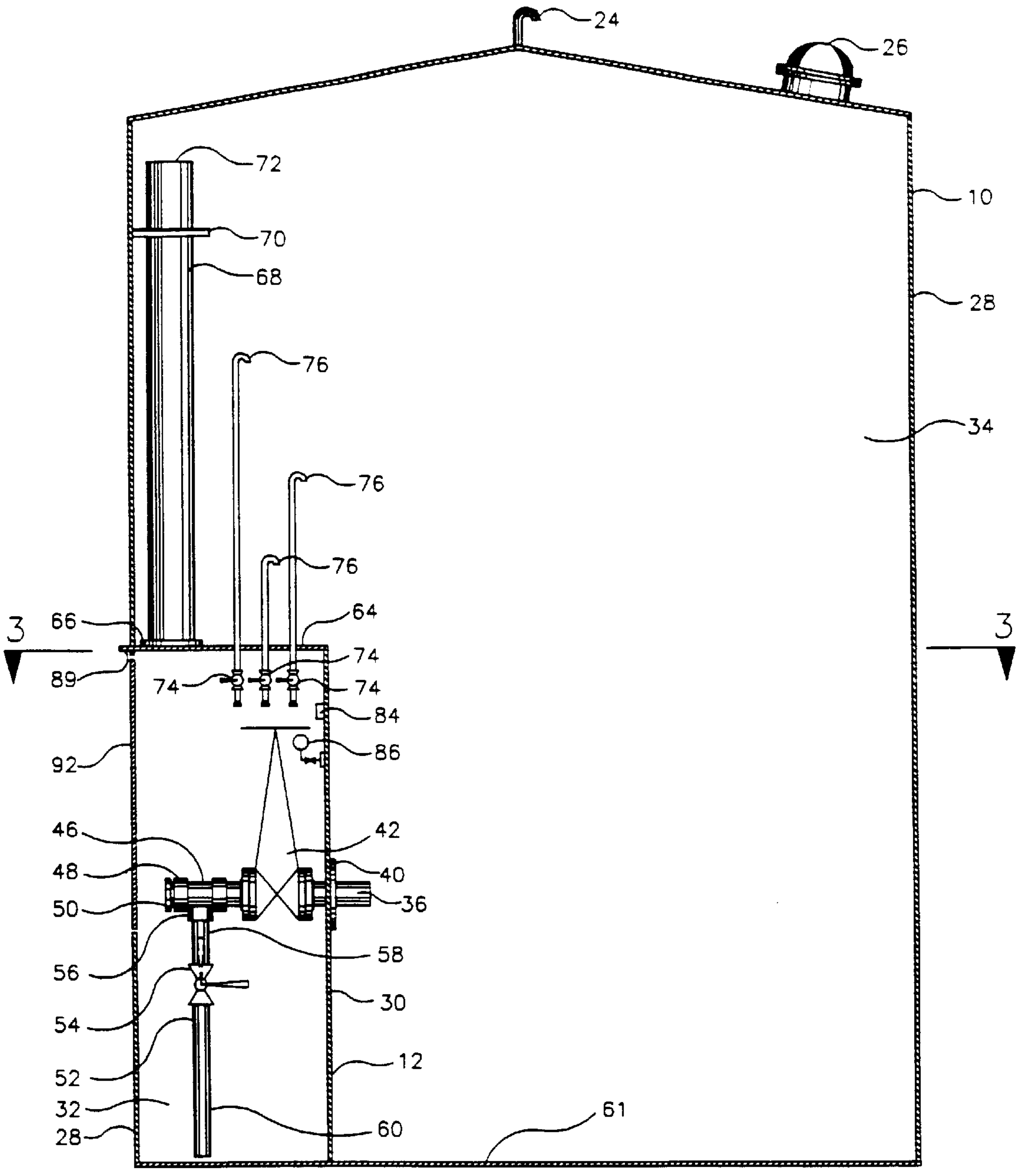
FIG. 2 is a cross-section of the first embodiment along line 2—2 of FIG. 1.

Referring to FIG. 2, the valve and spill containment system (12) is mounted inside the tank (10) immediately adjacent the outer tank wall (28). The system (12) is comprised of a inner tank wall (30) separating the secondary chamber (32) from the primary oil accumulation chamber (34).

Figure 4:
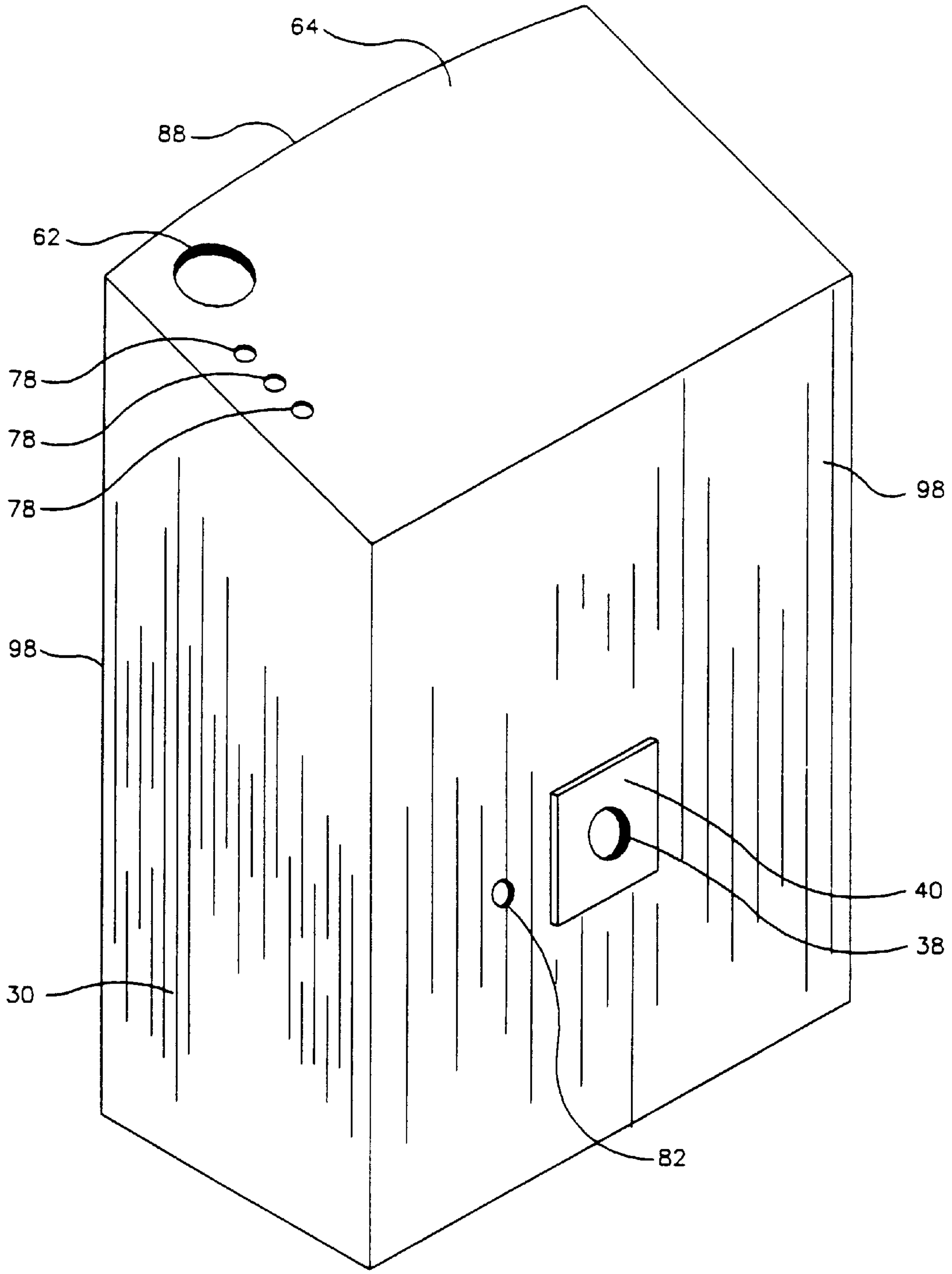
FIG. 4 is a pictorial view of another embodiment of the invention.
Figure 5:
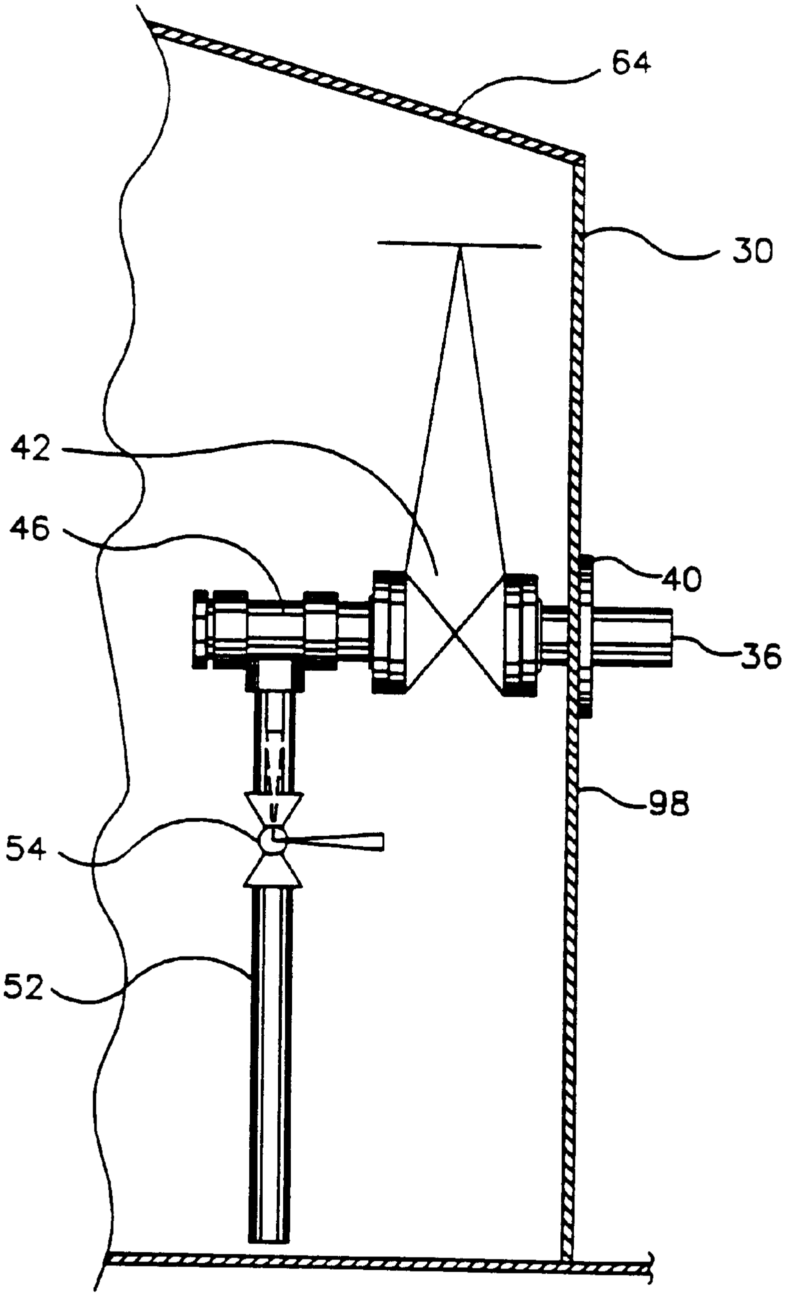
FIG. 5 is a schematic cross-section of the embodiment depicted in FIG. 4 along line 5—5 of FIG. 4.

As shown in FIG. 2, the inner tank wall (30) defines a secondary chamber (32) of about 6 feet in height, 4 feet in width and 2½ feet deep. The inner tank wall (30) may be formed of a single sheet of steel and bent and welded to form the cabinet-like structure depicted in FIG. 2. Another embodiment of the inner tank wall (30) is shown in FIG. 4.

The outer and inner tank walls (28,30) are typically and preferably made of steel, but may be made of any appropriate material such as plastic or fibreglass. In the preferred embodiment, the outlet pipe (36) is welded into the outlet opening (38) and is further supported by a reinforcing pad (40) welded to inner tank wall (30). The outlet pipe (36) is preferably 3" in outside diameter and 12" long. There is an outlet valve (42) attached to the outlet pipe (36), which is preferably a 3" gate valve well known in the art. The outlet valve (42) is attached to a 3" by 3" by 2" tee fitting (46). The outside end of the tee fitting (48) is capped by a bull plug (50). The outlet pipe (36) should extend at least 4" into the secondary chamber (32) to accommodate the studs (not shown) used to secure the outlet pipe (36) to the outlet valve (42).

When fluid is drawn from the outlet pipe (36), the bull plug (50) is removed and a female camlock fitting (not shown) is attached. Then a conventional hose and male camlock fitting may be secured prior to opening the outlet valve (42).

The recovery pipe (52) and recovery valve (54) are attached to the tee fitting (46) and the recovery pipe (52) extends downwardly into the secondary chamber (32). In the preferred embodiment, the recovery pipe (52) is 2" in outside diameter and the recovery valve (54) is a 2" ball valve which attaches to the bottom end (56) of the tee fitting (46). The top end (58) of the recovery pipe (52) attaches to the recovery valve (54). The bottom end (60) of the recovery pipe (52) should have a minimum clearance of about 1½" from the tank floor (61). In the preferred embodiment, there is about a 2" clearance.

The manner of connecting the outlet pipe (36), the outlet valve (42), the tee fitting (46), the recovery valve (54) and the recovery pipe (52) are well known in the art and need not be described or depicted.

When spilled fluid has accumulated in the secondary chamber (32), it may be recovered by the vacuum truck by closing the outlet valve (42) and opening the recovery valve (54). Spilled fluid is then drawn out of the secondary chamber (32) by the vacuum truck.

Figure 3:
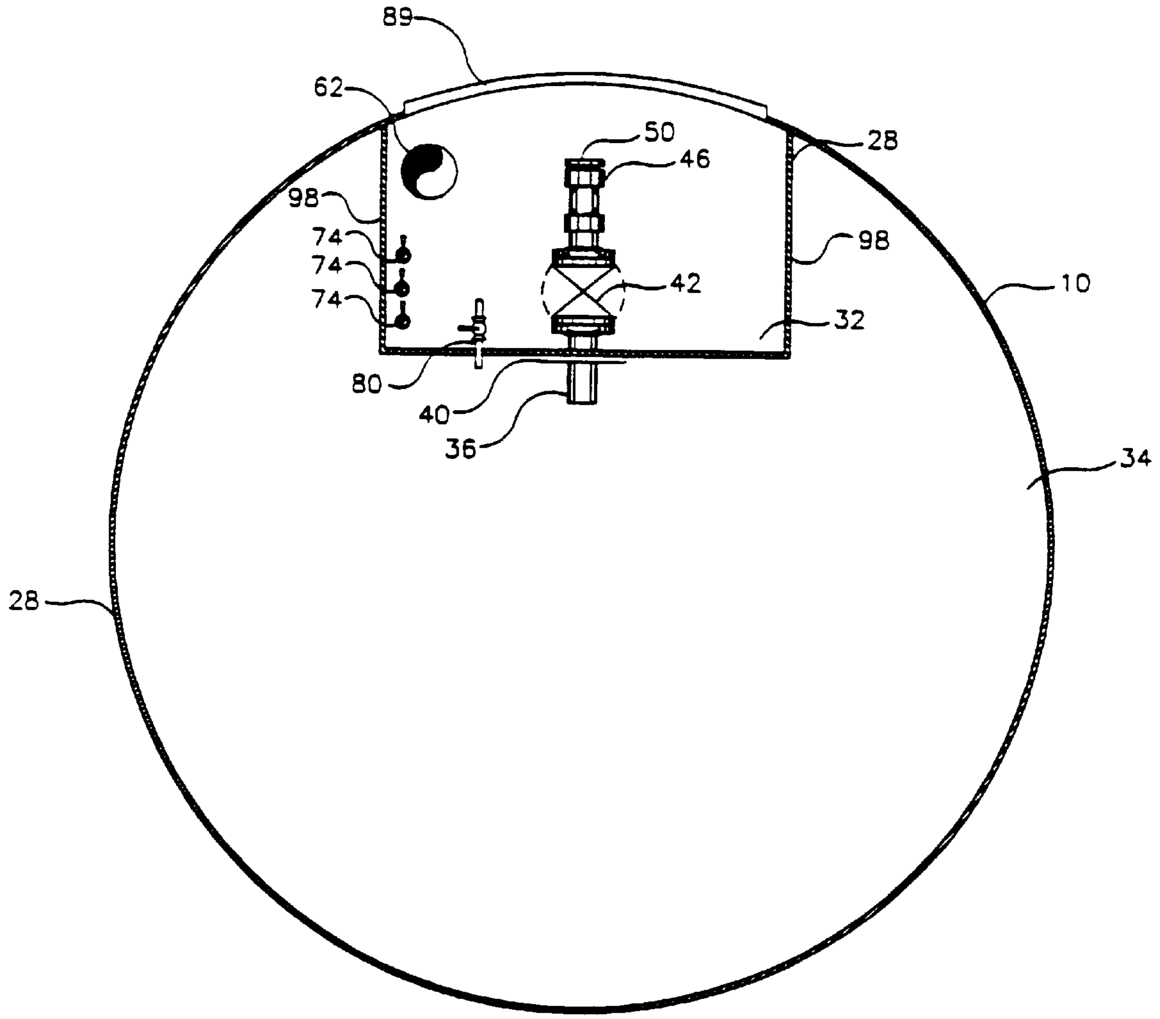
FIG. 3 is a cross-section of the first embodiment along line 3—3 of FIG. 1 and FIG. 2.

As shown in FIGS. 3 and 4, the overflow opening (62) in the inner tank wall (30) is positioned on the top section (64) of the inner tank wall (30). The overflow opening (62) communicates with the bottom end (66) of the overflow tube (68) as shown in FIG. 2. The overflow tube (68) extends upward into the primary chamber (34) and is secured to the outer tank wall (28) by an attachment member (70). The overflow tube (68) is of such a length that the top end (72) of the overflow tube (68) is positioned just below the top of the tank (10). As is obvious, when the tank is filled to capacity, oil will flow into the top end (72) of the overflow tube (68) and be deposited through the overflow opening (62) into the secondary chamber (32), where it may be recovered as described above.

In the preferred embodiment, the overflow tube (68) is 6" in diameter and is made of steel, although the dimension and composition of the overflow tube (68) are not essential to its function.

The overflow tube (68) also acts as a pressure equalization conduit. When the vent (24) and thief hatch (26) freeze shut in cold weather, the overflow tube (68) allows outside air to be drawn into the primary chamber (34) when fluid is removed from the tank (10) by the vacuum truck, thereby preventing the creation of a partial vacuum within the tank (10) which may cause the tank to collapse. Otherwise, the tank (10) could collapse from the vacuum pressure created within the tank (10).

Figure 2A:
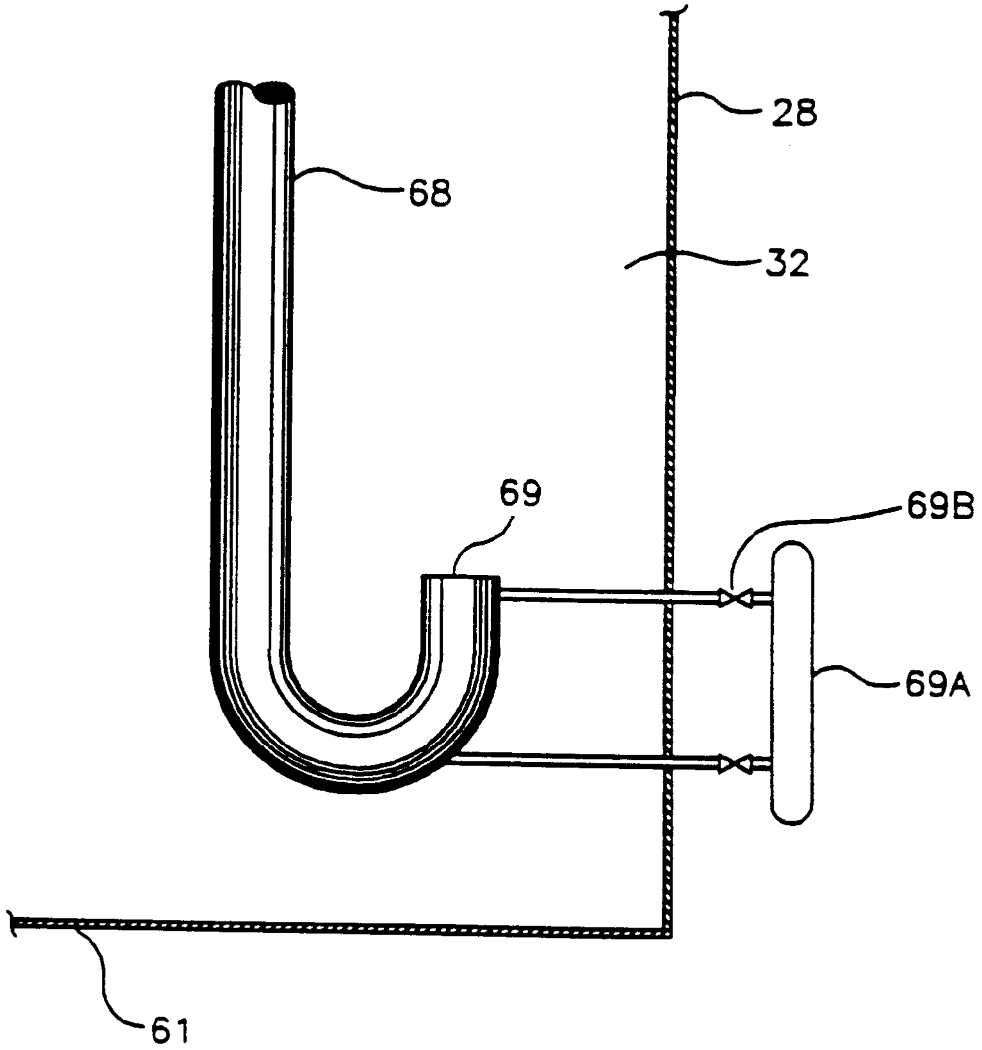
FIG. 2A is a cross-section of an alternative embodiment of the invention.

In a tank (10) which stores fluids from a well where sour gas or other hazardous or flammable gas is produced, it may be necessary to install a safety system in the overflow tube (68). If the vent (24) and the thief hatch (26) freeze shut, such hazardous or flammable gases may build up in the primary chamber (34) and in the secondary chamber (32) through the overflow tube (68). A person opening the secondary chamber (32) may then be subjected to a hazardous situation. Therefore, in an alternative embodiment, the overflow tube (68) includes along its length a "U" shaped fluid trap (69) as shown in FIG. 2A. The fluid trap (69) may be filled with coloured ethylene glycol and include a sight glass (69A) which is visible from the exterior of the tank (10). The sight glass (69A) may be isolated form the fluid trap (69) by isolation valves (69B). If a gas build-up has occurred within the secondary chamber (32) from the primary chamber (34) through the overflow tube (68), then the coloured ethylene glycol will have been blown out of the fluid trap (69) into the secondary chamber (32). In that case, no colour will be visible through the sight glass (69A) and a person approaching the tank (10) may take note and will be able to take the appropriate safety precautions.

The fluid trap (69) and sight glass (69A) may be substituted by alternative sensing means such as gas sensors in the secondary chamber (32) which are sensitive to sour gas or flammable gases which may have built up. Such sensors are well known in the art and may be connected to gauges or other indicators mounted on the exterior of the tank (10).

In an alternative embodiment of the invention, the loading spout (16) on the exterior of the tank (10) may be replaced by an internal riser tube (not shown) which extends upwardly from the secondary chamber (32), through the inner tank wall (30). The riser tube extends to approximately the 12 foot level of the primary chamber (34), which permits gravity loading of oil from above the end of the riser tube. The bottom end of the riser tube is located in the secondary chamber (32) and ends with a 4 inch ball valve and a nozzle (not shown). The nozzle may be plugged with a bull plug which is removed and replaced with a female camlock fitting to which a conventional hose and male camlock fitting may be attached during the unloading of oil.

In the preferred embodiment, the secondary chamber (32) may also enclose sample taps (74) which are fitted to the end of sample tubes (76). Sample tubes (76) are used to determine the level of oil, water or particulate matter such as sand in the tank (10). The sample tubes (76) pass through sample openings (78) in the inner tank wall (30) and extend upwardly into the primary chamber (34). The upper ends of the sample tubes (76) are preferably curved over as shown in FIG. 2. This U-shaped curve prevents sand or other solid particulate matter from entering the sample tube (76). In the preferred embodiment, there are three sample tubes (76) which rise to approximately the six foot, nine foot and 12 foot marks respectively.

The sample tubes are preferably made of ½" pipe and the sample taps are preferably ½" ball valves.

There may also be a sample tap (74) at the 3 foot level (80) which is provided through an opening (82) in the inner tank wall (30).

The secondary chamber (32) may also enclose an electronic level indicator (84), a temperature gauge (86) or other similar devices which are mounted externally on prior art tanks.

In FIG. 2, the top section (64) of the inner tank wall (30) is shown to be horizontal. In another embodiment, the top section (64) may be angled downwards toward the center of the tank (10), as is shown in FIG. 4. The angle of the top section (64) prevents sand or other particulate matter from settling on the top section (64). In either embodiment, the outside edge (88) of the top section (64) must be cut to fit the curve of the outer tank wall (28) if the tank (10) is cylindrical. It is preferable if the outside edge of the top section (88) protrude slightly past the outer tank wall (28) to form a rain guard (89) as is shown in FIGS. 2 and 3.

Access to the secondary chamber (32) and, therefore, to the outlet valve (42), tee fitting (46), recovery valve (54) and sample taps (74) is provided through an opening (90) in the outer tank wall (28). The opening (90) is preferably covered by a moveable door (92). In the preferred embodiment, the door is hinged along one lateral edge (94) and a Slamlock™ (96) or similar latching mechanism is provided to releasably secure the door (92) in the opening (90). The door (92) is preferably insulated on the exterior by using a spray-on urethane foam or some other insulating material.

The opening (90) should be positioned to allow ready access to the outlet valve at the three foot mark. Also it should be of sufficient size to allow easy handling of the components in the secondary chamber. In the preferred embodiment, the bottom of the opening (90) is approximately 30 inches from the tank floor (61) and is approximately 36 inches square.

The inner tank wall (30) is welded to the outer tank wall (28) to seal the primary chamber (34) and secondary chamber (32). If the tank walls are made of materials other than steel, suitable attachment methods should be chosen with regard to the choice of material.

Figure 6:
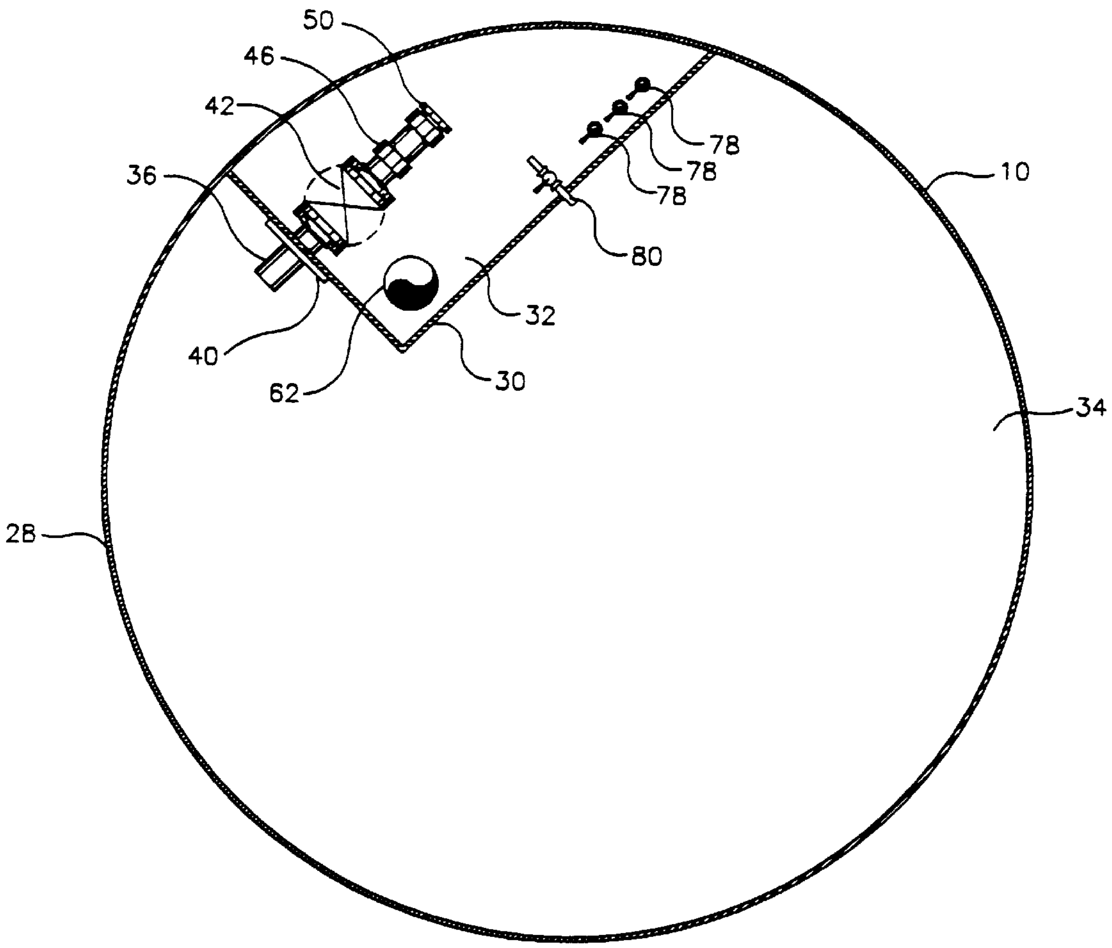
FIG. 6 is a cross-section of another embodiment of the invention, similar to FIG. 3.
Figure 7:
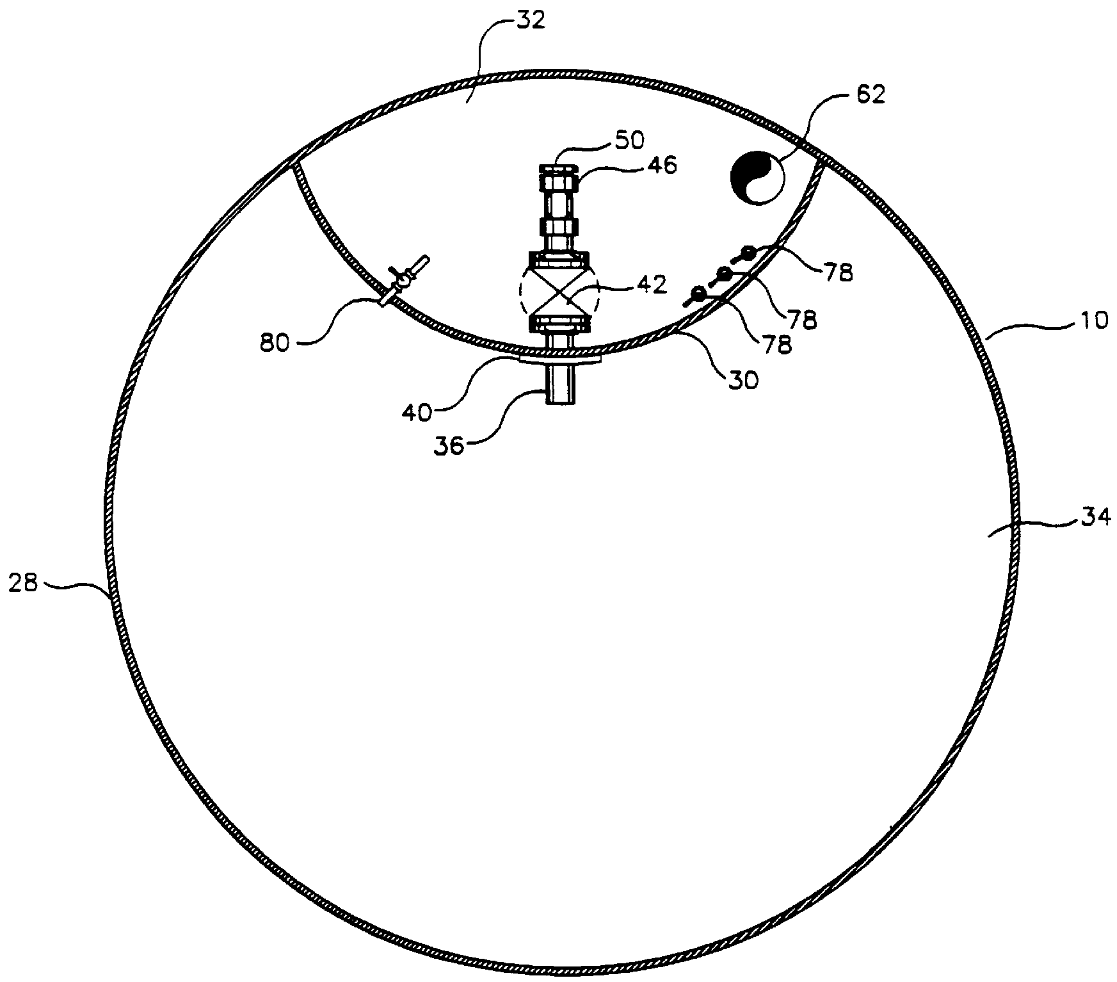
FIG. 7 is a cross-section of another embodiment of the invention, similar to FIG. 3.

The embodiment shown in FIGS. 3 and 4 shows a rectangular secondary chamber (32) formed by a inner tank wall (30), having three lateral sections (98). Other embodiments are of course possible. As is shown in FIG. 6, the inner tank wall (30) may have 2 lateral sections (98) forming a triangular secondary chamber (32). In FIG. 7, the inner tank wall (30) is curved, forming a semi-circular secondary chamber (32).

Those skilled in the art will readily appreciate that any modification may be affected in the arrangement of the present invention without departing from the scope of the present invention.

The embodiments of the invention in which an exclusive property or privilege is claimed are defined as follows:

1. An above-ground fluid storage tank having a valve and spill containment system, comprising:

(a) an outer tank wall having a tank floor, lateral section and a tank roof defining a primary fluid collection chamber;

(b) an inner tank wall, secured to the outer tank wall, defining a secondary containment chamber within the primary chamber, the inner tank wall further defining an opening;

(c) recovery means within the secondary chamber for recovering fluids for the secondary chamber;

(d) outlet means secured to the inner tank wall and associated with the opening for draining the primary chamber, which outlet means are enclosed by the secondary containment chamber; and (e) access means for providing access to the secondary containment chamber and the outlet means.

2. The fluid storage tank of claim 1 wherein the access means comprises an opening defined by the outer tank wall, a door moveable between an open position and a closed position within the opening and latch means to releasably secure the door in a closed position.

3. The fluid storage tank of claim 1 wherein recovery means is secured to the outlet means.

4. The fluid storage tank of claim 3 wherein the outlet means comprises an outlet pipe secured to the inner tank wall, outlet valve means for controlling fluid flow through the outlet means attached to the outlet pipe and a nozzle attached to the outlet valve means.

5. The fluid storage tank of claim 4 wherein the recovery means comprises recovery valve means for controlling fluid flow through the outlet means and a recovery pipe having a top end and a bottom end where the recovery valve means is attached to the outlet means and the top end of the recovery pipe is attached to the recovery valve means and the recovery pipe extend downwardly into the secondary chamber such that the second end is in close proximity to but separated from the tank floor.

6. The fluid storage tank of claim 5 wherein the outlet valve means is between the nozzle and the outlet pipe and the recovery valve means is attached to the nozzle such that when the outlet valve means is closed and the recovery valve means is open, fluid in the secondary chamber may be recovered by applying a vacuum source to the nozzle.

7. The fluid storage tank of claim 4 further comprising internal loading means for removing oil from the primary chamber, said loading means comprising a second opening defined by the inner tank wall, a riser tube having an upper end and lower end associated with the second opening such that the upper end is located in the primary chamber and the lower end is located in the secondary chamber and the upper end is above the lower end and loading valve means associated with the lower end to control fluid flow through the riser tube.

8. The fluid storage tank of claim 4 further comprising an overflow tube within the primary chamber, the overflow tube having a top end and a bottom end, wherein the top end is situated just below the top of the primary chamber and the bottom end is in sealed fluid communication with the secondary chamber through an overflow opening defined by the inner tank wall such that fluid entering the top end of the overflow tube is deposited into the secondary chamber.

9. The fluid storage tank of claim 8 wherein the overflow tube comprises a "U" shaped fluid trap and a sight glass which is visible from the exterior of the tank such that a visibly distinct fluid introduced into the fluid trap is retained within the overflow tube and visible through the sight glass from the exterior of the tank.

10. The fluid storage tank of claim 8 wherein there are four sample tubes, where the top end of each sample tube is situated at a different level within the primary chamber.

11. The fluid storage tank of claim 1 further comprising a sensor within the secondary chamber for detecting hazardous or flammable gases within the secondary chamber and an indicator coupled with the sensor to indicate the presence of such gases.

12. A valve and spill continent device for use in an above-ground fluid storage tank having a tank floor, which device is attached to the interior of the tank to form an accessible secondary containment chamber within the fluid storage tank, the device comprising:

(a) a containment wall defining an outlet opening;

(b) outlet means sealingly attached to the containment wall around the outlet opening; and (c) recovery means attached to the outlet means for recovering fluids from the secondary chamber;

where the outlet means and recovery means are enclosed by the secondary chamber.

13. The device of claim 12 wherein the outlet means comprises an outlet pipe sealingly engaged to the containment walls outlet valve means for controlling fluid flow through the outlet means attached to the outlet pipe and a nozzle attached to the outlet valve means.

14. The device of claim 13 wherein the recovery means comprises recovery valve means for controlling fluid flow through the recovery means and a recovery pipe having a top end and a bottom end where the recovery valve means is attached to the outlet means and the top end of the recovery pipe is attached to the recovery valve means and the recovery pipe extends downwardly into the secondary chamber such that the second end is in close proximity to but separated from the tank floor.

15. The device of claim 14 wherein the outlet valve means is between the nozzle and the outlet pipe and the recovery valve means is attached to the nozzle such that when the outlet valve means is closed and the recovery valve means is open, fluid in the secondary chamber may be recovered by applying a vacuum source to the nozzle.

16. The device of claim 12 wherein the containment wall has a top section and at least one lateral section and the outlet opening is defined by at the least one lateral section.

17. The device of claim 16 wherein the top section of the containment wall is angled from a horizontal plane.

* * * * *

UNITED STATES PATENT AND TRADEMARK OFFICE

CERTIFICATE OF CORRECTION

PATENT NO. : 5,960,826
DATED : October 5, 1999
INVENTOR(S) : Russ Hebblethwaite, et al It is certified that error appears in the above-identified patent and that said Letters Patent is hereby corrected as shown below:

On the title page: Item [30]

Foreign Application Priority Data.
Feb. 8, 1996
Canada
2,169,126

| | |
|---|---|
| Column 6, line 36 | change "for" to --from-- |
| Column 7, line 35 | change "continent" to --containment-- |

Signed and Sealed this

Twenty-fifth Day of April, 2000

Attest:

Q. TODD DICKINSON

Attesting Officer

*Director of Patents and Trademarks*